(12) United States Patent
Esman et al.

(10) Patent No.: US 11,315,010 B2
(45) Date of Patent: Apr. 26, 2022

(54) NEURAL NETWORKS FOR DETECTING FRAUD BASED ON USER BEHAVIOR BIOMETRICS

(71) Applicant: Splunk Inc., San Francisco, CA (US)

(72) Inventors: Gleb Esman, San Francisco, CA (US); Oleg Izmerly, Redmond, WA (US)

(73) Assignee: SPLUNK INC., San Francisco, CA (US)

(*) Notice: Subject to any disclaimer, the term of this patent is extended or adjusted under 35 U.S.C. 154(b) by 619 days.

(21) Appl. No.: 15/731,059

(22) Filed: Apr. 17, 2017

(65) Prior Publication Data

US 2018/0300625 A1 Oct. 18, 2018

(51) Int. Cl.
*G06N 3/08* (2006.01)
*G06F 16/22* (2019.01)
*H04L 29/06* (2006.01)
*H04L 29/08* (2006.01)
*G06N 3/04* (2006.01)
*H04L 67/02* (2022.01)

(52) U.S. Cl.
CPC ............ *G06N 3/08* (2013.01); *G06F 16/22* (2019.01); *G06N 3/0454* (2013.01); *H04L 63/1408* (2013.01); *H04L 63/1425* (2013.01); *H04L 67/02* (2013.01)

(58) Field of Classification Search
CPC ........ G06N 3/08; G06N 3/0454; G06F 16/22; H04L 63/1408; H04L 63/1425; H04L 67/02
See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,230,009 B1 * | 7/2012 | Wong .................. H04L 12/6418 709/203 |
| 8,751,529 B2 | 6/2014 | Zhang et al. |
| 8,788,525 B2 | 7/2014 | Neels et al. |
| 8,826,434 B2 | 9/2014 | Merza |
| 8,880,441 B1 | 11/2014 | Chen et al. |
| 8,983,994 B2 | 3/2015 | Neels et al. |

(Continued)

FOREIGN PATENT DOCUMENTS

JP 1998207441 A * 8/1998

OTHER PUBLICATIONS

Alfredo Canziani, Eugenio Culurciello, Adam Paszke, "An Analysis of Deep Neural Network Models for Practical Applications", arXIV-1605.07678v4, pp. 1-7, Apr. 14, 2017. (Year: 2017).*

(Continued)

*Primary Examiner* — Brian M Smith
(74) *Attorney, Agent, or Firm* — Artegis Law Group, LLP

(57) ABSTRACT

One embodiment of the present invention sets forth a technique for predicting fraud by analyzing user behavior biometric data via a neural network (NN). The technique includes receiving cursor movement data generated via at least one client device, where the cursor movement data is associated with a group of one or more users. The technique further includes generating a plurality of images based on the cursor movement data and training a first neural network (NN) model based on the plurality of images and based on a discard rate that is greater than 50%.

28 Claims, 13 Drawing Sheets

(56) References Cited

U.S. PATENT DOCUMENTS

| | | | |
|---|---|---|---|
| 9,053,424 | B1 | 6/2015 | Lewis et al. |
| 9,124,612 | B2* | 9/2015 | Vasan ................ H04L 67/1097 |
| 9,128,980 | B2 | 9/2015 | Neels et al. |
| 9,130,971 | B2 | 9/2015 | Vasen et al. |
| 9,173,801 | B2 | 11/2015 | Merza |
| 9,185,095 | B1 | 11/2015 | Moritz et al. |
| 9,215,240 | B2 | 12/2015 | Coates et al. |
| 9,248,068 | B2 | 2/2016 | Merza |
| 9,286,413 | B1 | 3/2016 | Coates et al. |
| 9,426,172 | B2 | 8/2016 | Merza |
| 9,432,396 | B2 | 8/2016 | Merza |
| 9,589,012 | B2 | 3/2017 | Neels et al. |
| 10,127,258 | B2 | 11/2018 | Lamas et al. |
| 10,210,522 | B1 | 2/2019 | Medina, III et al. |
| 2006/0224898 | A1 | 10/2006 | Ahmed |
| 2007/0126732 | A1* | 6/2007 | Robertson ............. G06T 15/503 |
| | | | 345/419 |
| 2010/0082400 | A1 | 4/2010 | Bagherjeiran et al. |
| 2011/0083108 | A1* | 4/2011 | Klein .................... G06F 3/0481 |
| | | | 715/859 |
| 2012/0328190 | A1 | 12/2012 | Bercovich et al. |
| 2013/0135339 | A1* | 5/2013 | Saini ........................ G09G 5/28 |
| | | | 345/613 |
| 2015/0019537 | A1 | 1/2015 | Neels et al. |
| 2015/0205957 | A1 | 7/2015 | Turgeman et al. |
| 2016/0085986 | A1 | 3/2016 | Long |
| 2016/0088125 | A1 | 3/2016 | Polychronis |
| 2016/0234023 | A1 | 8/2016 | Mozer et al. |
| 2016/0350650 | A1* | 12/2016 | Leeman-Munk ........ G06N 3/08 |
| 2016/0360202 | A1* | 12/2016 | Xu ....................... H04N 19/176 |
| 2016/0371823 | A1* | 12/2016 | Kimura .................... G06T 5/50 |
| 2016/0378295 | A1* | 12/2016 | Cousins .............. G06F 3/04812 |
| | | | 715/702 |
| 2017/0070521 | A1 | 3/2017 | Bailey et al. |
| 2017/0070534 | A1 | 3/2017 | Bailey et al. |
| 2017/0140240 | A1 | 5/2017 | Socher |
| 2017/0140279 | A1 | 5/2017 | Turgeman |
| 2017/0195356 | A1 | 7/2017 | Turgeman et al. |
| 2017/0206405 | A1 | 7/2017 | Molchanov et al. |
| 2017/0221064 | A1* | 8/2017 | Turgeman .......... G06Q 20/4016 |
| 2017/0243223 | A1* | 8/2017 | Kolotinsky ........... G06F 3/0484 |
| 2017/0322637 | A1* | 11/2017 | Cheng ..................... G06F 11/00 |
| 2017/0353482 | A1 | 12/2017 | Sommer |
| 2018/0012003 | A1* | 1/2018 | Asulin .................. G06F 21/316 |
| 2018/0032835 | A1 | 2/2018 | Shirahata |
| 2018/0068430 | A1 | 3/2018 | Sang et al. |
| 2018/0189056 | A1* | 7/2018 | Turakhia ............... G06F 9/3001 |
| 2018/0211157 | A1 | 7/2018 | Liu et al. |
| 2019/0098106 | A1 | 3/2019 | Mungel et al. |

OTHER PUBLICATIONS

Adnan Khashman, Kamil Dimiler, "Image Compression Using Neural Networks and Haar Wavelet", WSEAS Transactions on Signal Processing, ISSN: 1790-5052, pp. 1-10, May 2008. (Year: 2008).*
Pivot Manual, Splunk Enterprise 6.1.3 (Aug. 4, 2014), 30 pages.
Knowledge Manager Manual, Build a Data Model, Splunk Enterprise 6.1.3 pp. 150-204 (Aug. 25, 2014).
Non-Final Office Action received for U.S. Appl. No. 15/665,301, dated Sep. 24, 2020, 55 pages.
Final Office Action received for U.S. Appl. No. 15/665,301, dated Apr. 2, 2021, 55 pages.
Non-Final Office Action for U.S. Appl. No. 15/731,098; dated Nov. 16, 2020; 36 pages.
Non-Final Office Action received for U.S. Appl. No. 15/731,098 Dated Mar. 8, 2019, 47 pages.
Final Office Action received for U.S. Appl. No. 15/731,098 Dated Sep. 6, 2019, 40 pages.
Final Office Action received for U.S. Appl. No. 15/731,098 Dated May 7, 2021, 60 pages.
Notice of Allowance received for U.S. Appl. No. 15/731,098 Dated May 13, 2020, 37 pages.
Non-Final Office Action received for U.S. Appl. No. 15/731,104 Dated Mar. 8, 2019, 56 pages.
Final Office Action received for U.S. Appl. No. 15/731,104 Dated Jul. 25, 2019, 47 pages.
Non-Final Office Action received for U.S. Appl. No. 15/731,104 Dated Apr. 14, 2020, 50 pages.
Notice of Allowance received for U.S. Appl. No. 15/731,104 Dated Sep. 28, 2020, 79 pages.
Notice of Allowance received for U.S. Appl. No. 15/731,104 Dated Apr. 30, 2021, 75 pages.
Advisory Action received for U.S. Appl. No. 15/665,301, dated Jun. 18, 2021, 13 pages.
Splunk Enterprise 8.0.0 Overview, available online, retrieved on May 20, 2020 from docs.splunk.com, 17 pages.
Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved on May 20, 2020, 6 pages.
Carraso, David, "Exploring Splunk," published by CITO Research, New York, NY, Apr. 2012, 156 pages.
Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

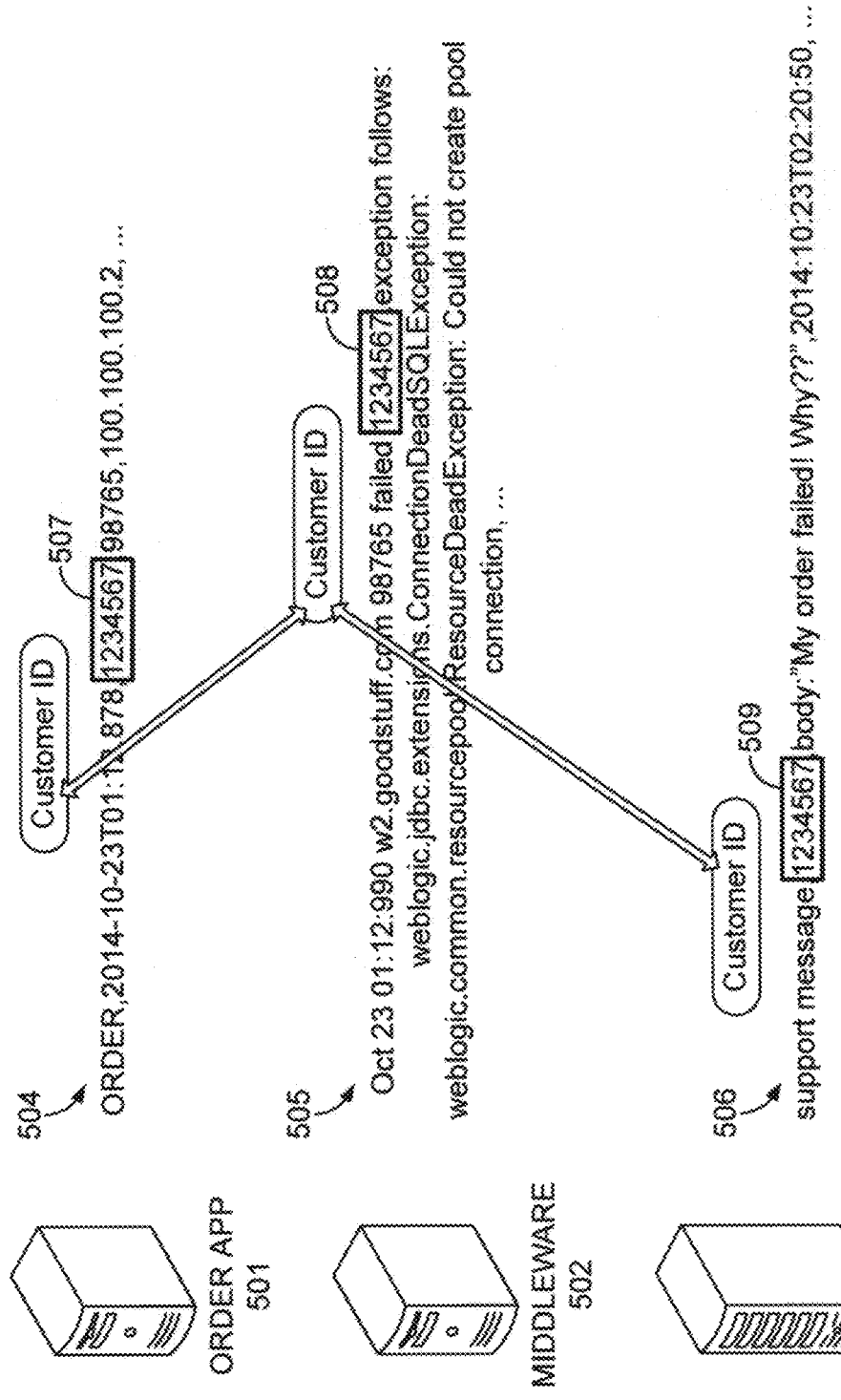

FIG. 6A

| Data Summary | | | |
|---|---|---|---|
| Hosts (5) | Sources (8) | Sourcetypes (3) | |
| filter | | | |
| Host ≑ | | Count ≑ | Last Update ≑ |
| mailsv | all ∨ | 9,829 | 4/29/14 1:32:47.000 PM |
| vendor_sales | all ∨ | 30,244 | 4/29/14 1:32:46.000 PM |
| www1 | all ∨ | 24,221 | 4/29/14 1:32:44.000 PM |
| www2 | all ∨ | 22,595 | 4/29/14 1:32:47.000 PM |
| www3 | all ∨ | 22,975 | 4/29/14 1:32:45.000 PM |

FIG. 6B

USER 1
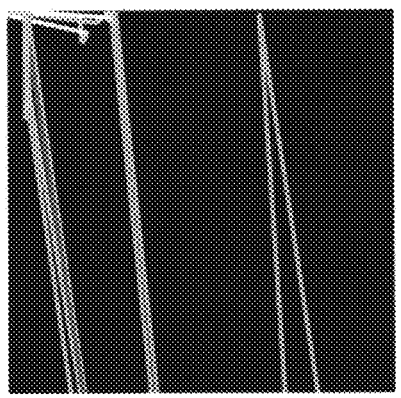
(A)
USER 2
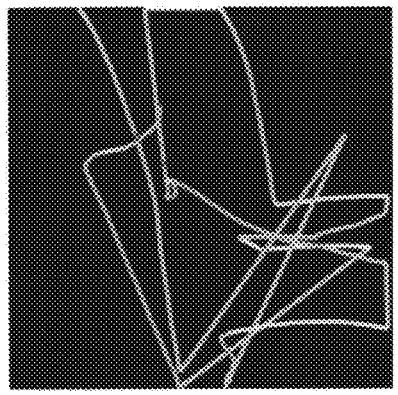
(D)
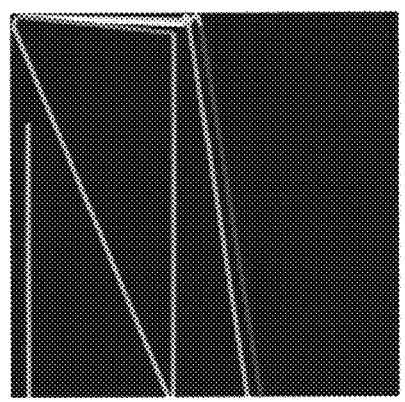
(B)
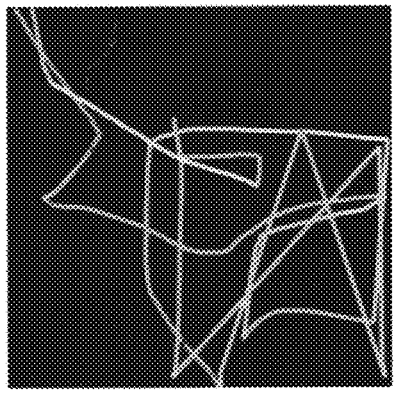
(E)
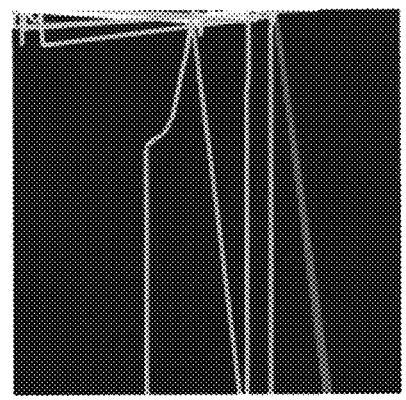
(C)
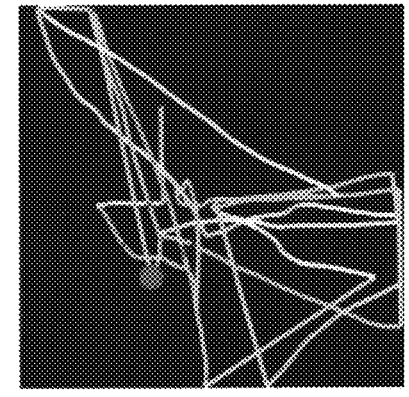
(F)
FIG. 10

NEURAL NETWORKS FOR DETECTING FRAUD BASED ON USER BEHAVIOR BIOMETRICS

BACKGROUND

Field of the Embodiments

The various embodiments relate generally to computer security systems and, more specifically, to fraud detection based on user behavior biometrics.

Description of the Related Art

Many web-based applications that provide services, such as financial services and information technology (IT) management, implement one or more types of security measures to prevent access by unauthorized users. For example, a web-based application may require a user to authenticate via a username, password, digital certificate, token, etc. Although these types of security measures generally deter unauthorized users from accessing sensitive information and resources, such security measures cannot, by themselves, prevent unauthorized access if the underlying credentials are compromised.

In order to detect whether a particular service is being accessed by an unauthorized user, such as when user credentials have been stolen, conventional techniques commonly compare characteristics of the user's computer to historical records to infer whether the user is an authorized user. For example, many conventional techniques compare the current Internet protocol (IP) address of the user's computer to the IP address(es) that have been used in the past to access the service. Additionally, some techniques may compare a device identifier (e.g., a media access control (MAC) address) associated with the computer that is accessing the service to a device identifier previously used by an authorized user to access the service. Then, if one of these types of values does not match a value associated with an authorized user, then access to a service may be restricted.

One drawback to these approaches is that characteristics of a user's device, such as an IP address and a device identifier, can be emulated by an unauthorized user in order to evade conventional security measures. Additionally, these types of approaches fail to prevent access by unauthorized users that have obtained control of an authorized user's physical computer, either by physical or remote means. For example, conventional approaches cannot detect when an unauthorized user, such as a caretaker or cohabitant, accesses a service via an authorized user's computer system. Similarly, conventional approaches typically cannot detect when a fraudster is remotely controlling an authorized user's computer to access a particular service.

As the foregoing illustrates, improved techniques for detecting fraudulent activity in computer systems would be useful.

SUMMARY

Embodiments of the present disclosure set forth a method for predicting fraud by analyzing user behavior biometric data via a neural network (NN). The method includes receiving cursor movement data generated via at least one client device, where the cursor movement data is associated with a group of one or more users. The method further includes generating a plurality of images based on the cursor movement data and training a first neural network (NN) model based on the plurality of images and based on a discard rate that is greater than 50%.

Further embodiments provide, among other things, a system and a non-transitory computer-readable storage medium configured to implement the techniques set forth above.

At least one advantage of the techniques described herein is that user fraud can be detected based on criteria, such as user cursor movements, that cannot be readily emulated by a fraudster. Accordingly, fraud can be more effectively detected, even when an attacker has taken physical or remote control of an authorized user's computer. Further, by correlating the results of behavior biometric analysis with other data sources, such as log data received from a client device and/or one or more server devices, the accuracy of fraud prediction can be improved. Finally, various techniques described herein are capable of effectively generalizing patterns included in small datasets of behavior biometric data, enabling more accurate comparisons to be made between the small datasets and behavior biometric data associated with an unknown user.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

The patent or application file contains at least one drawing executed in color. Copies of this patent or patent application publication with color drawing(s) will be provided by the Office upon request and payment of the necessary fee.

FIG. 5 illustrates a scenario where a common customer ID is found among log data received from three disparate sources in accordance with the disclosed embodiments;

FIG. 6A illustrates a search screen in accordance with the disclosed embodiments;

FIG. 6B illustrates a data summary dialog that enables a user to select various data sources in accordance with the disclosed embodiments;

FIG. 10 illustrates biometric images generated based on cursor data received from two different users in accordance with the disclosed embodiments;

DETAILED DESCRIPTION

Figure 1:
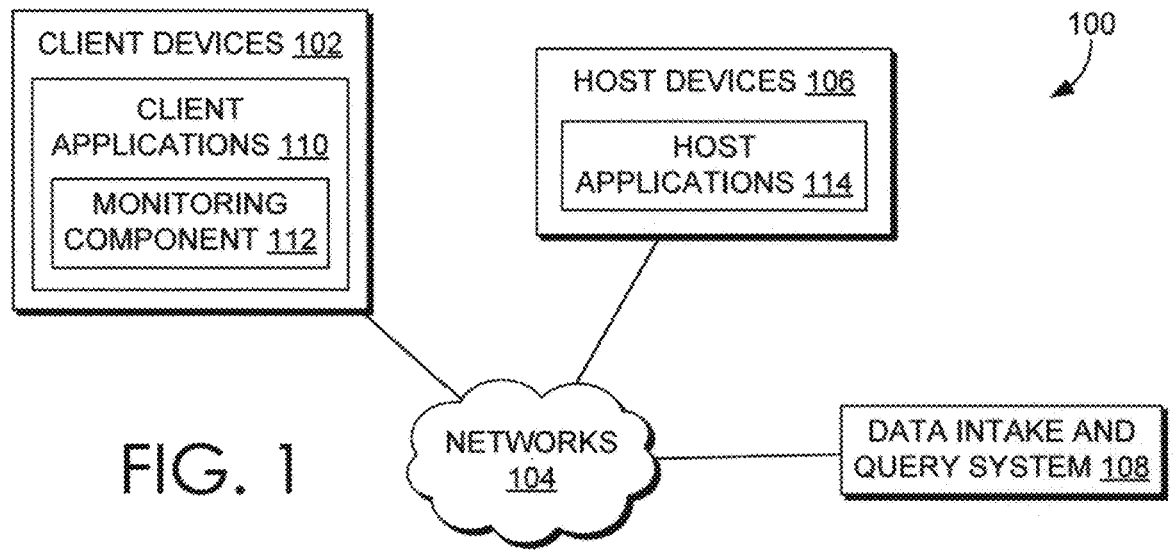
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
     2.5.1. Input
     2.5.2. Parsing
     2.5.3. Indexing
   2.6. Query Processing
   2.7. Field Extraction
   2.8. Example Search Screen
   2.9. Data Modelling
   2.10. Security Features
   2.11. Detecting Fraud Based On Behavior Biometric Data
     2.11.1 Correlating Behavior Biometric Results with Log Data
     2.11.2 Generating and Training a Neural Network
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time.

Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
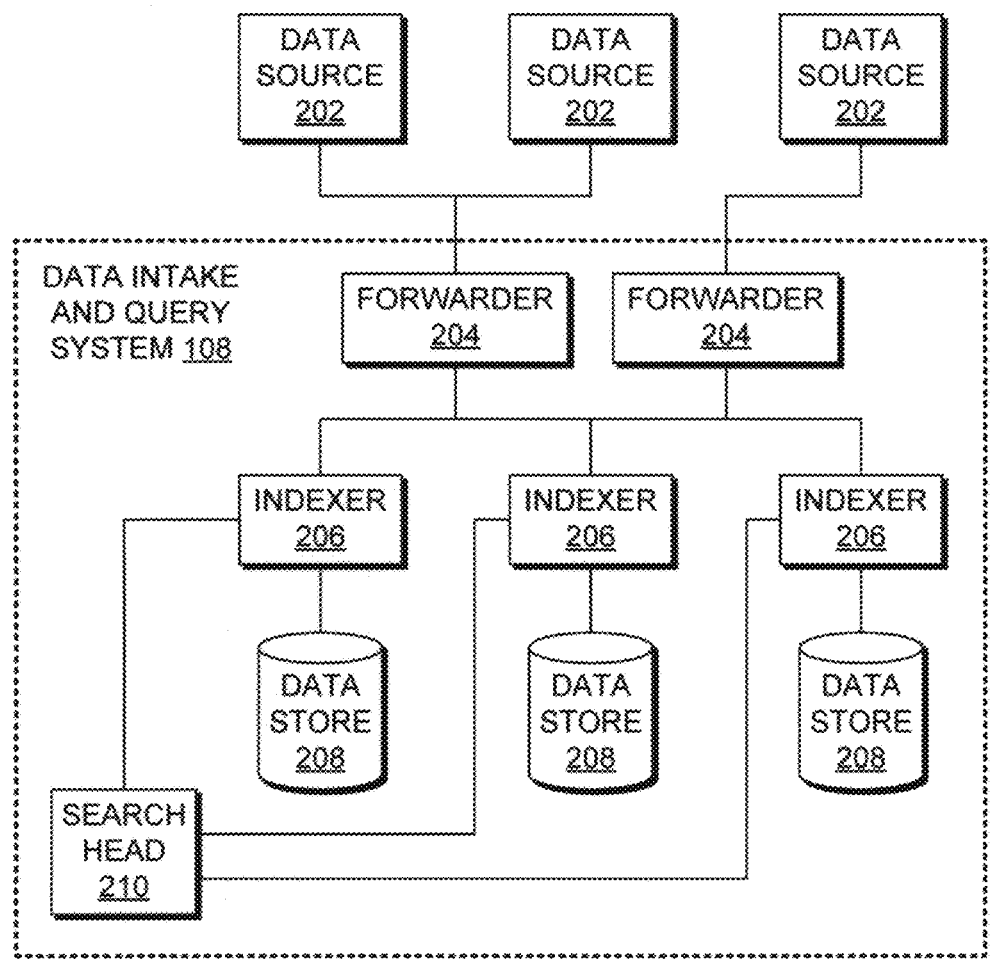
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
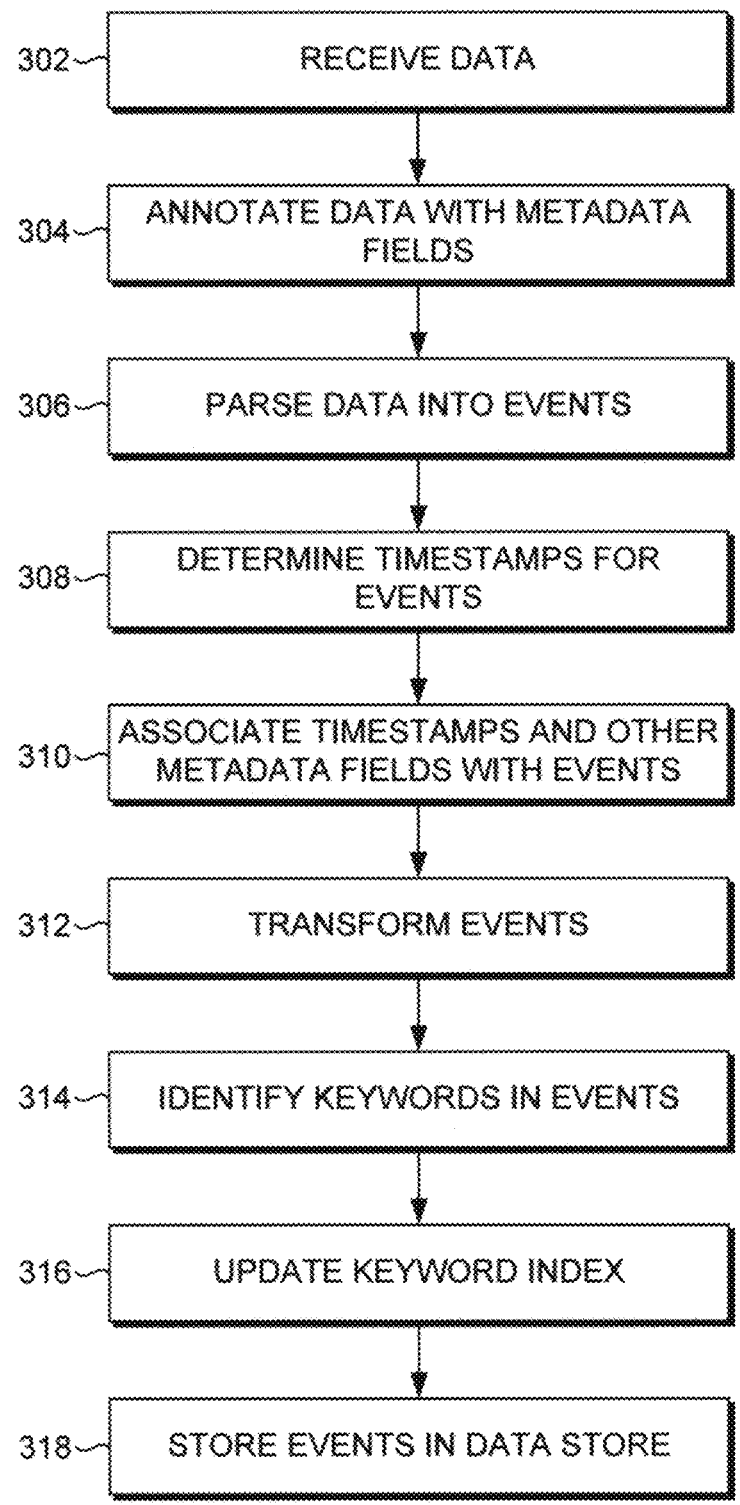
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
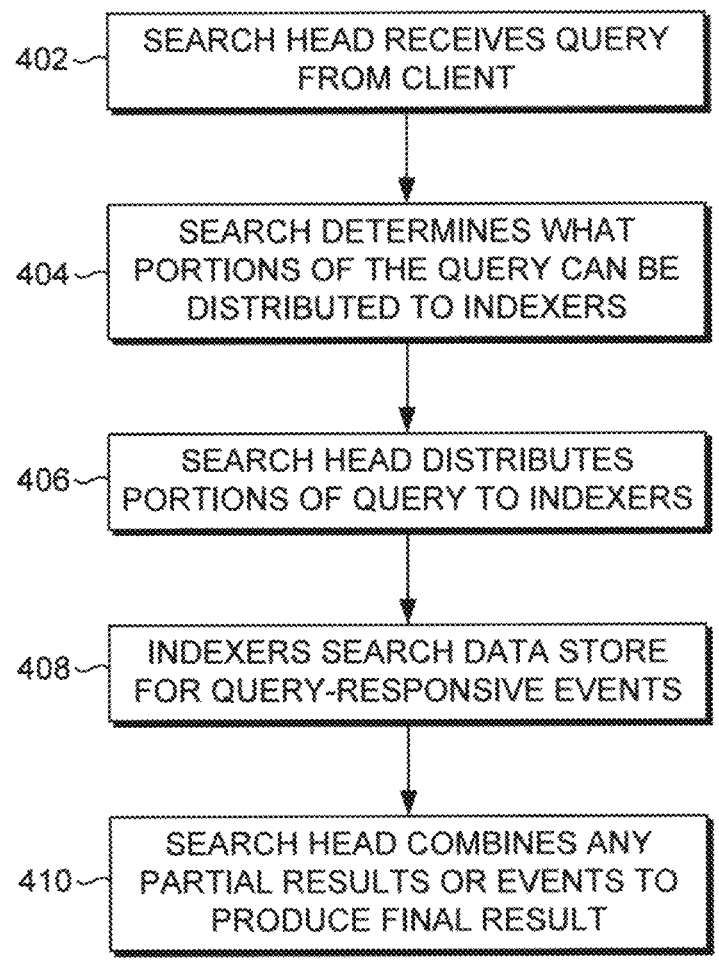
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
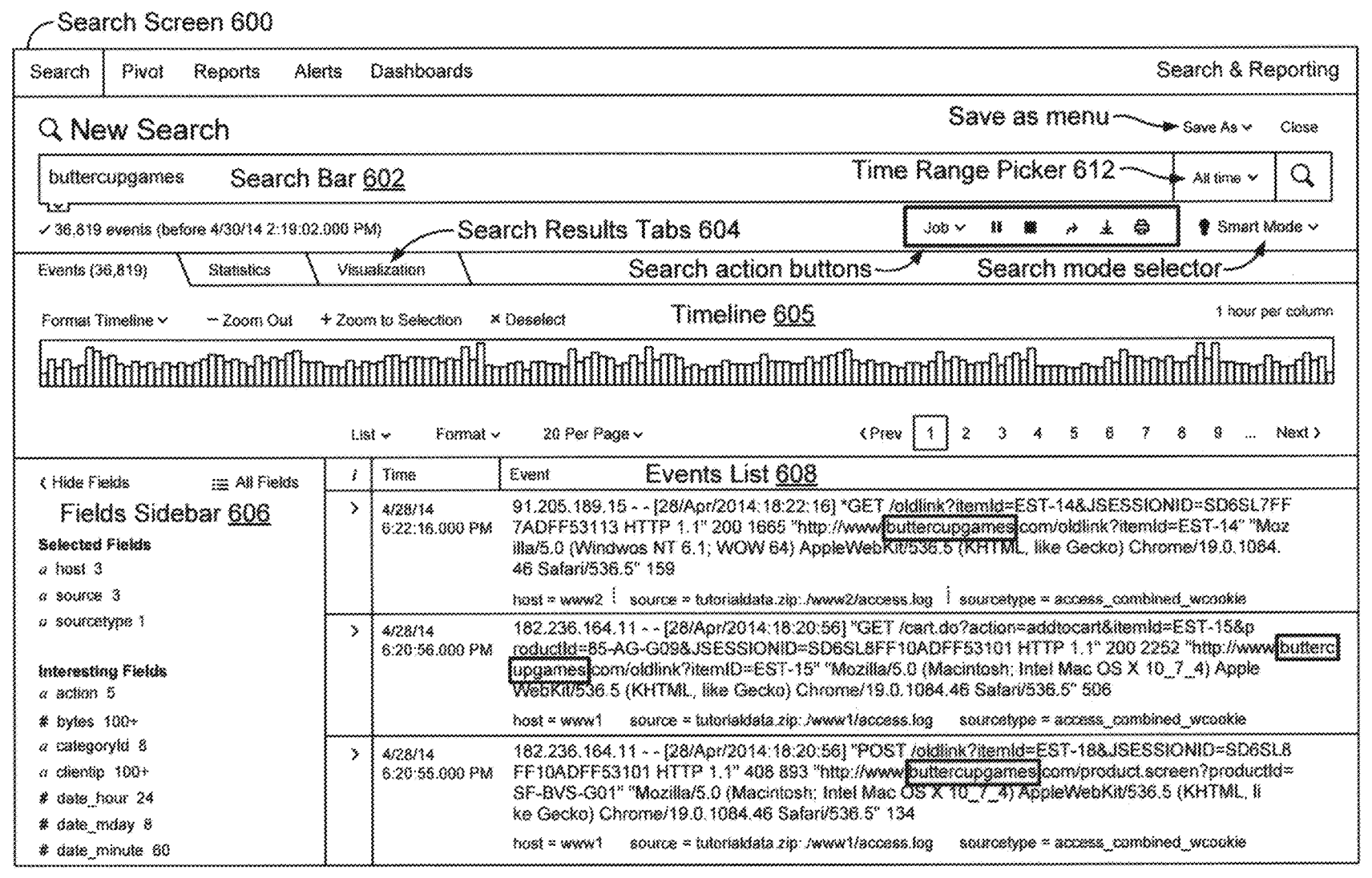

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.11. Detecting Fraud Based on Behavior Biometric Data

As noted above, in order to detect whether a particular service is being accessed by an unauthorized user, such as when user credentials have been compromised, conventional techniques commonly compare characteristics of a computer being used to access the service to known values associated with an authorized user. Based on these characteristics of the computer that is accessing the service, a prediction is then made regarding whether the user is an authorized user or a fraudster.

However, these types of conventional techniques suffer from a number of drawbacks. In particular, fraudsters are becoming more and more capable of emulating various aspects of their interactions with web-based services and resources, such as by emulating an IP address and/or a device identifier to match the values associated with an authorized user. Further, fraudsters may obtain control of an authorized user's physical computer, either via physical presence or remote means, such that the IP address and device identifier match the values expected by a particular service. As a result, conventional techniques are insufficient for detecting more advanced instances of user fraud.

Accordingly, various embodiments disclosed herein collect and analyze behavior biometric data associated with an input device that is being used to interact with a particular service or resource. In some embodiments, the behavior biometric data is then converted into one or more images and compared to known images associated with a group of one or more users, such as a group of one or more authorized users. These comparisons may be made via one or more machine learning algorithms, such as by analyzing the images via a neural network (NN). A prediction is then made regarding whether the biometric data belongs to the group of one or more users, for example, in order to determine whether a user associated with the biometric data is likely to be a fraudster.

Further, in various embodiments, the biometric data may be correlated with one or more other types of data associated with a user and/or a computing device that is accessing the service or resource. For example, a result of analyzing the biometric data (e.g., a score that indicates a likelihood of fraud) may be correlated with one or more other aspects of the user session, such as the screen resolution of the user's device, a user agent (e.g., a web browser) being implemented to access the service or resource, and/or the specific types of activities being performed during the user session. A risk score may then be generated based on the analysis of the biometric data and the one or more aspects of the user session.

Additionally, in some embodiments, a small dataset of biometric data (e.g., less than 1,000 images of cursor movement data) associated with a known group of one or more users may be implemented to predict fraud. For example, in various embodiments, the biometric techniques disclosed herein may be implemented to predict fraud in applications where an authorized user or group of users infrequently accesses a particular service or resource and, thus, only a small dataset of biometric data is available for the user or group of users. In such embodiments, various aspects of a NN may be modified in order to improve the detection accuracy. For example, by implementing a dropout rate that is greater than 50% (e.g., a dropout rate greater than 75%), a NN may be forced to generalize patterns included in a small dataset. Accordingly, by more effectively generalizing patterns included in images of biometric data, such as images of cursor movement, the NN techniques described herein are able to more accurately predict whether a user is a member of a particular group. These and other approaches are described below in further detail in conjunction with FIGS. 7A, 7B, 8, 9A, 9B, and 10-12.

Figure 7A:
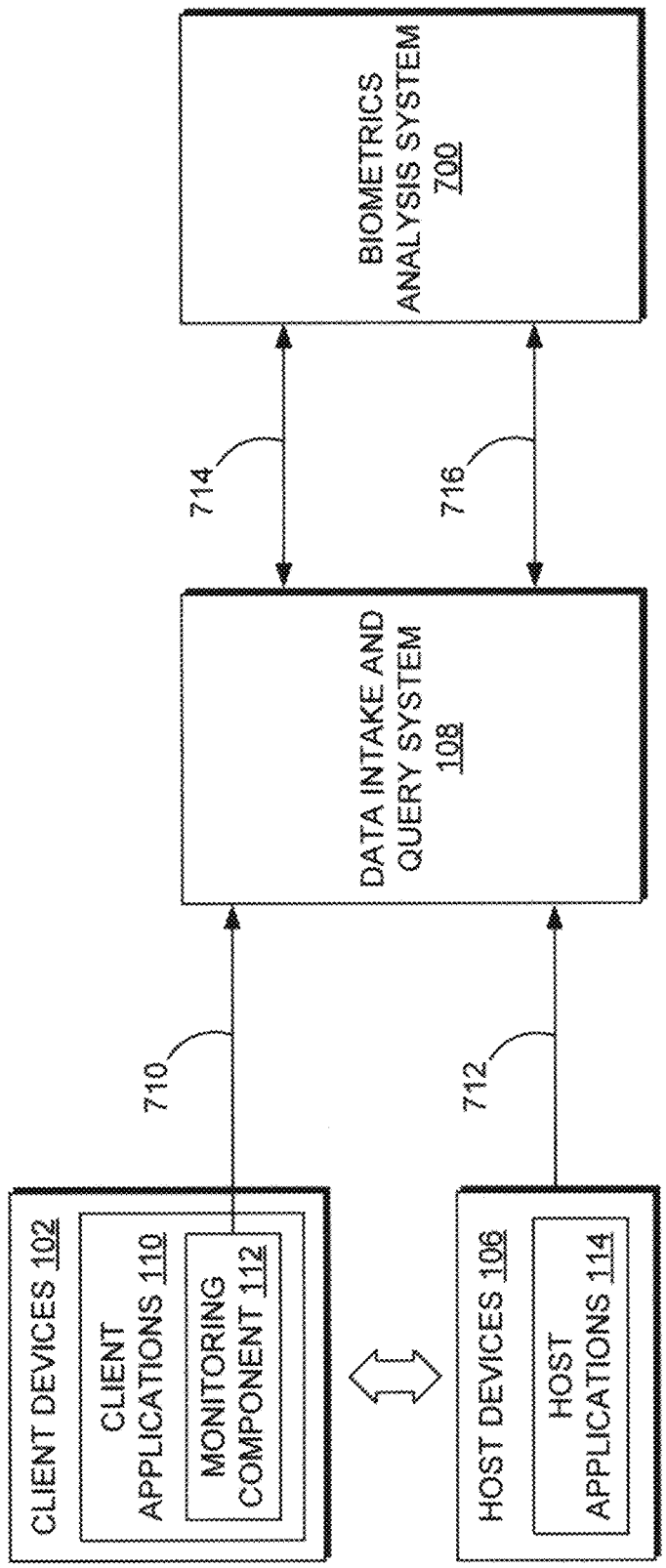
FIGS. 7A and 7B are conceptual block diagrams of a biometrics analysis system configured to interact with the data intake and query system of FIG. 1 to implement one or more aspects of the disclosed embodiments.
Figure 7B:
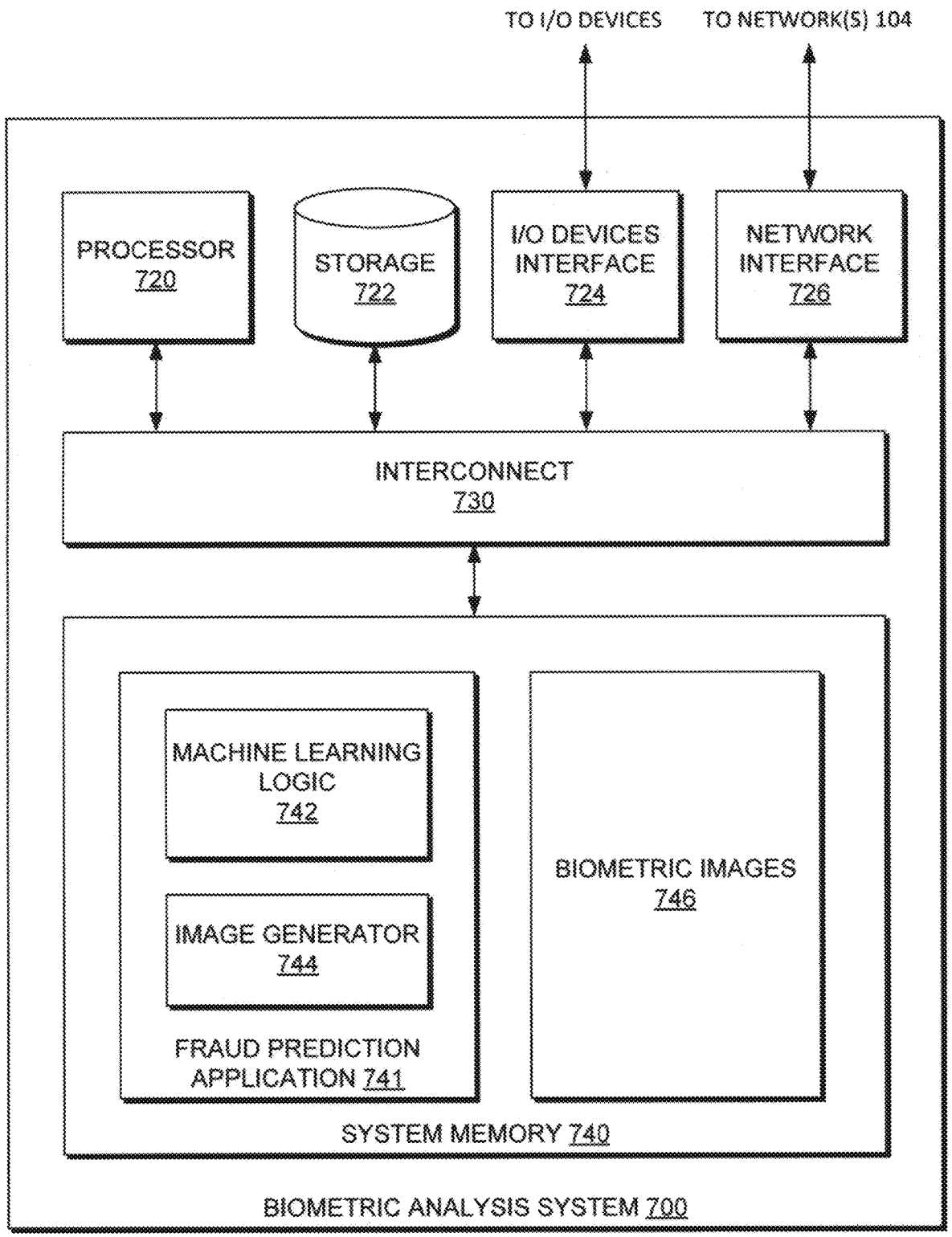

FIGS. 7A and 7B are conceptual block diagrams of a biometrics analysis system 700 configured to interact with the data intake and query system 108 of FIG. 1 to implement one or more aspects of the disclosed embodiments. As shown in FIG. 7B, the biometrics analysis system 700 includes a processor 720, storage 722, an input/output (I/O) devices interface 724, a network interface 726, an interconnect 730, and a system memory 740. The memory 110 includes a fraud prediction application 741 and biometric images 746. The fraud prediction application 741 includes machine learning logic 742 and an image generator 744.

The processor 720 may be any technically feasible form of processing device configured to process data and execute program code. The processor 720 could include, for example, and without limitation, a system-on-chip (SoC), a central processing unit (CPU), a graphics processing unit (GPU), an application-specific integrated circuit (ASIC), a digital signal processor (DSP), a field-programmable gate array (FPGA), and so forth. Processor 720 includes one or more processing cores. In operation, processor 720 is the master processor of biometrics analysis system 700, controlling and coordinating operations of other system components.

System memory 740 may include a memory module or a collection of memory modules. The fraud prediction application 741 is executed by the processor 720 to implement the overall functionality of the biometrics analysis system 700. For example, and without limitation, behavior biometric data (e.g., cursor movements and click events) acquired from one or more client devices 102 via the data intake and query processing system 108 may be processed by the image generator 744 to generate biometric images 746. The biometric images 746 may then be transmitted to the machine learning logic 742 to train a model (e.g., a neural network (NN)), to generate weights for a model, and/or to generate predictions based on a model.

I/O devices interface 724 may receive and/or transmit data to/from input devices, output devices, and devices capable of both receiving input and providing output. For example, and without limitation, I/O devices interface 724 could interface with wired and/or wireless communication devices that send data to and/or receive data.

In some embodiments, the biometrics analysis system 700 may be implemented via one or more computing systems that are separate from, but in communication with, the data intake and query processing system 108. In other embodiments, the biometrics analysis system 700 may be included in and/or implemented by the data intake and query processing system 108.

In such embodiments, both the data intake and query processing system 108 may be implemented via some or all of the same components (e.g., the same processor(s) 720, storage 722, memory 740, etc.) in order to receive data from one or more client devices 102 and/or host devices 106 and analyze the data to predict fraudulent behavior. However, the embodiments disclosed herein contemplate any technically feasible system configured to implement the functionality of the biometrics analysis system 700.

Figure 8:
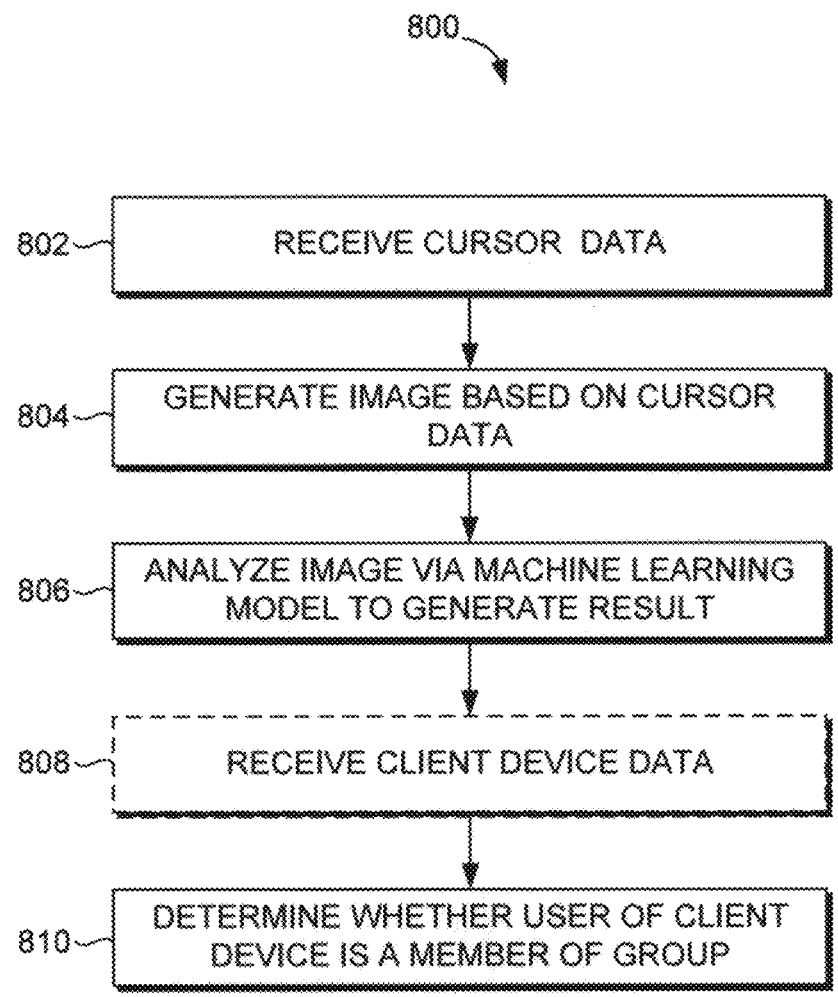
FIG. 8 illustrates a flow diagram of method steps for predicting user fraud based on behavior biometric data in accordance with the disclosed embodiments.

FIG. 8 illustrates a flow diagram of method steps for predicting user fraud based on behavior biometric data in accordance with the disclosed embodiments. Although the method steps are described in conjunction with the systems of FIGS. 1, 2, 7A, and 7B, persons skilled in the art will understand that any system configured to perform the method steps, in any order, falls within the scope of the present invention.

As shown in FIG. 8, a method 800 begins at step 802, where the fraud prediction application 741 receives cursor data 714 from data intake and query system 108. In various embodiments, cursor data 714 may be contained in one or more events, where each event may include timestamped cursor data associated with a particular period of time. For example, as described herein, cursor data 714 and/or other types of data (e.g., client data 710) could be stored as one or more events that comprise machine-generated data and are associated with one or more specific points in time. For example, events may be derived from "time series data" that corresponds to cursor locations, cursor events, etc. that are associated with successive points in time.

In general, the cursor data 714 may include any type of data indicative of user interactions that are received via an input device (e.g., a mouse, a touchpad, a touchscreen, etc.), including cursor movement data (e.g., timestamped (x,y) coordinates) and click events (e.g., left click, right click, click-and-drag, etc.). For example, each unit of cursor data could include an x-coordinate, a y-coordinate, a timestamp, a userID, and/or an eventID (e.g., a type of click event). In some embodiments, cursor data is collected at millisecond intervals, such as every 10 milliseconds.

In various embodiments, data intake and query system 108 may generate cursor data 714 based on client data 710 that is received from one or more client devices 102. For example, monitoring component 112 could include a forwarding script that receives cursor data and/or other types of user session data that reflects user activity within a client application 110. The forwarding script could then forward the cursor data and/or other user session data to the data intake and query system 108 in the form of client data 710. In general, the forwarding script could written in any programming language, including JavaScript, C++, etc. For example, the forwarding script could be a JavaScript snippet included in a web application, such as a financial services web portal, and the client data 710 could be transmitted in a JavaScript Object Notation (JSON) format from the web application to the data intake and query system 108. As noted above, the data intake and query system 108 could then convert the client data 710 into one or more events and store the events for later searching and retrieval.

Figure 9A:
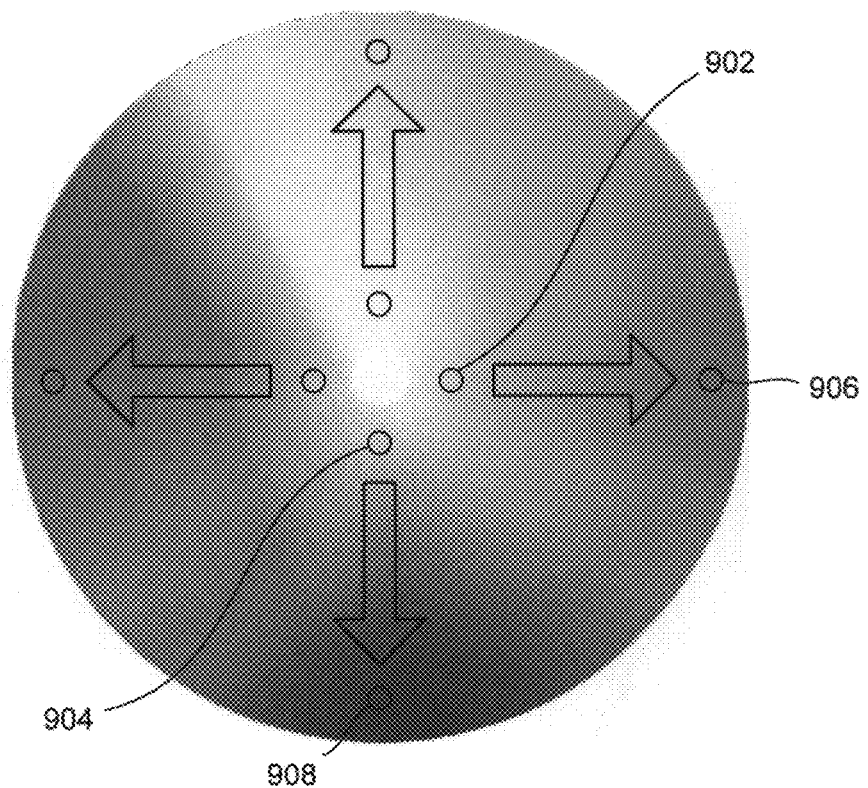
FIG. 9A illustrates a technique for encoding cursor movement direction via image parameters in accordance with the disclosed embodiments.

Next, at step 804, fraud prediction application 741 generates one or more biometric images 746 via image generator 744 based on the cursor data 714. The biometric image(s) 746 are then stored in system memory 740 and/or storage 722 in any feasible format (e.g., Joint Photographic Experts Group (JPEG) or Portable Network Graphics (PNG)). In various embodiments, image generator 744 encodes the speed and/or direction of cursor movements and/or click events included in the cursor data 714 in one or more image parameters. In some embodiments, as shown in FIG. 9A, cursor movement direction may be encoded via a color value, and cursor movement speed may be encoded via a transparency value.

For example, when cursor movement data indicates that a cursor was moved to the right at a low rate of speed (e.g., point 902 in FIG. 9A), then the resulting line of the cursor movement included in the biometric image 746 generated by image generator 744 may be a red color having a high transparency value. In another example, when cursor movement data indicates that a cursor was moved towards the bottom of a screen at a low rate of speed (e.g., point 904 in FIG. 9A), then the resulting line of the cursor movement included in the biometric image 746 may be a blue color having a high transparency value. Alternatively, if, in either of the above examples, the cursor was moved to the right or towards the bottom of the screen at a higher rate of speed, then the resulting line of the cursor movement included in the biometric image 746 would have a lower transparency value, as shown at points 906 and 908, respectively.

In some embodiments, the image generator 744 encodes the speed of cursor movement on a transparency layer of an image. The image generator 744 then flattens the transparency layer with one or more other layers, such as a white background layer, so that fast cursor movements will be defined by brighter, more desaturated colors, while slow cursor movements will be defined by darker, more saturated colors. The image generator 744 may further flatten the resulting cursor movement lines onto a black background to generate a high-contrast image that can be more easily analyzed by the machine learning logic 742. For example, as shown in FIG. 10, which illustrates biometric images 746 generated based on cursor data received from two different users, differences in user behavior are readily discernible when cursor movements and click events are displayed in a high-contrast image.

Figure 9B:
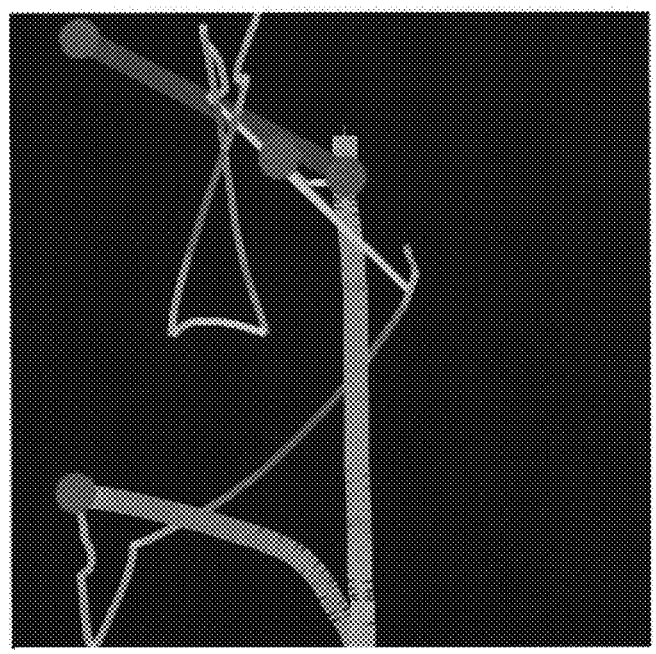
FIG. 9B illustrates a biometric image generated via the technique of FIG. 9A in accordance with the disclosed embodiments.

Further, in some embodiments, click events may be encoded via one or more image parameters. For example, as shown in FIG. 9B, left click events and right click events could be encoded as geometric objects (e.g., circles, rectangles, polygons, freeform objects, etc.) having different colors, such as red and green. In addition, click-and-drag events could be encoded via line thickness. For example, as shown in FIG. 9B, image generator 744 could generate a thicker line when cursor data 714 indicates that cursor movement occurred during a click-and-drag event and a thinner line when cursor movement did not occur during a click-and-drag event.

At step 806, the fraud prediction application 741 analyzes the biometric image(s) 746 via machine learning logic 742 to generate a result. In various embodiments, at step 806, the machine learning logic 742 includes a neural network (NN) that has been trained, based a dataset of images associated with a group of one or more users, to predict whether a particular biometric image 746 of cursor data 714 belongs to that particular group of one or more users.

In such embodiments, the biometric image(s) 746 generated at step 804 are analyzed by the NN to generate a result, such as a probability that the cursor data 714 was generated by a fraudster. In some embodiments, the method 800 may then proceed to step 810, where the fraud prediction application 741 predicts, based on the result, whether the user associated with the biometric image(s) 746 is a member of the group. Alternatively or additionally, the fraud prediction application 741 could transmit the result to the data intake and query system 108, which could then predict whether the user associated with the biometric image(s) 746 is a member of the group. One or more actions could then be taken if the fraud prediction application 741 and/or data intake and query system 108 predicts that the user associated with the biometric image(s) 746 is not a member of the group, including restricting the user's access to a service, transmitting an alert to an authorized user or administrator, and/or transmitting a challenge-response prompt to the client device being operated by the user.

In some embodiments, a probability (e.g., of fraud) of 70% or greater could indicate that the biometric image 746 is associated with a user that is not a member of the group of one or more users. On the other hand, a probability of less than 50% could indicate that the biometric image 746 is associated with a user that is a member of the group of one or more users. Additionally, a probability of ~50% to ~70% could correspond to an indeterminate result.

In some embodiments, at step 806, the result could indicate that the cursor data was likely generated by a script attack, such as when a fraudster programs a script to interact with a service or resource in a specific manner (e.g., to perform a financial transaction quickly). For example, at step 806, the fraud prediction application 741 could analyze the biometric image(s) 746 and/or the cursor data 714 and determine that substantially no cursor movements occurred, indicating that a script attack was likely implemented. The fraud prediction application 741 could then generate a result indicating that the user is likely an unauthorized user and/or not a member of the group and output the result to the data intake and query system 108.

In various embodiments, the group of one or more users may include a single user (e.g., an authorized user of a particular account), or the group may include users having similar behavioral characteristics. For example, the group may include users that have similar age ranges, users of the same gender, users having similar employment and/or skill sets, and/or users that have some other relationship that is indicative of user behavior biometrics. In a specific example, a group of one or more users may include users that are known to be authorized users of a particular financial service or IT management portal. Because each user in the group is authorized to use the portal, each user is more likely to interact with the portal (e.g., via an input device) in a similar manner. For example, authorized users of a banking service portal typically perform similar types of actions, such as viewing an account balance and paying bills. Further, authorized users are more likely to be familiar with the interface associated with a portal and, thus, are likely to interact with the interface in a more controlled manner.

By contrast, unauthorized users, such as fraudsters, may perform different types of activities, such as changing a correspondence address, changing a password, changing notifications preferences, and/or performing an unusual financial transaction. Additionally, unauthorized users are less likely to be familiar with the interface associated with a portal and, thus, are likely to interact with the interface in a more erratic manner. Consequently, in many cases, cursor data generated by authorized users is likely to differ from cursor data generated by unauthorized users.

In some embodiments, machine learning logic 742 could be generated based on a convolutional NN model (e.g., a Visual Geometry Group (VGG) model) that is capable of performing image recognition. Different approaches for generating and training NN models, such as NN models that are based on VGG-16 and VGG-19 models, based on biometric images 746 associated with one or more groups of users are described below in further detail in conjunction with FIGS. 11 and 12.

2.11.1 Correlating Behavior Biometric Results with Log Data

Returning to step 806, in some embodiments, after the biometric image(s) 746 are analyzed by the machine learning logic 742, the method 800 could proceed to optional step 808, where the fraud prediction application 741 receives log data 716 associated with a client device 102 being operated by the user. In general, log data may include any type of data associated with a user session (e.g., a financial services session, an IT management session, etc.) and/or any type of data associated with a client device 102 that is being implemented to interact with a particular service or resource. In some embodiments, the log data is data 712 is transmitted from one or more host devices 106 to the data intake and query system 108 and optionally stored as one or more events.

Some of specific examples of log data 716 that could be received by fraud prediction application 741 at step 808 include a screen resolution of the client device 102 that is accessing a service or resource, an IP address of the client device 102, an identifier (e.g., MAC address) of the client device 102, a type of web browser implemented by the client device 102, and one or more types of activities being performed via the client device 102. For example, log data could indicate that a particular type of financial transaction has been performed via the client device 102 and/or that a change to a user address, a password, and/or a notification preference has been made via the client device 102.

Next, at step 810, when implementing optional step 808, the fraud prediction application 741 would predict, based on both the result and the log data, whether the user is a member of the group of one or more users. In some embodiments, the fraud prediction application 741 could predict whether the user is a member of group based on whether the result is above a threshold level (e.g., 70%) and based on whether one or more aspects of the log data match one or more known aspects of an account associated with an authorized user. For example, if the fraud prediction application 741 determines that the result is above the threshold level, then the fraud prediction application 741 could determine whether two or more of a screen resolution, a web browser, and an IP address associated with the client device 102 do not match a known screen resolution, a known web browser, and/or a known IP address associated with a user account. Then, if two or more aspects of the log data do not match known aspects of the authorized user's account, the fraud prediction application 741 could determine that the user is likely to be a fraudster.

Although steps 808 and 810 are described above as being performed by the fraud prediction application 741, in some embodiments, one or both of these steps may be performed by the data intake and query system 108. For example, the data intake and query system 108 could receive a result from the fraud prediction application 741 and then correlate the result with log data received from one or more clients devices 102 and/or host devices 106 in order to predict, based on any of the techniques described herein, whether a user is a member of particular group. The data intake and query system 108 could then perform one or more actions based on the prediction (e.g., restricting access to a service, issuing a challenge-response prompt, and/or transmitting an alert).

2.11.2 Generating and Training a Neural Network

Figure 11:
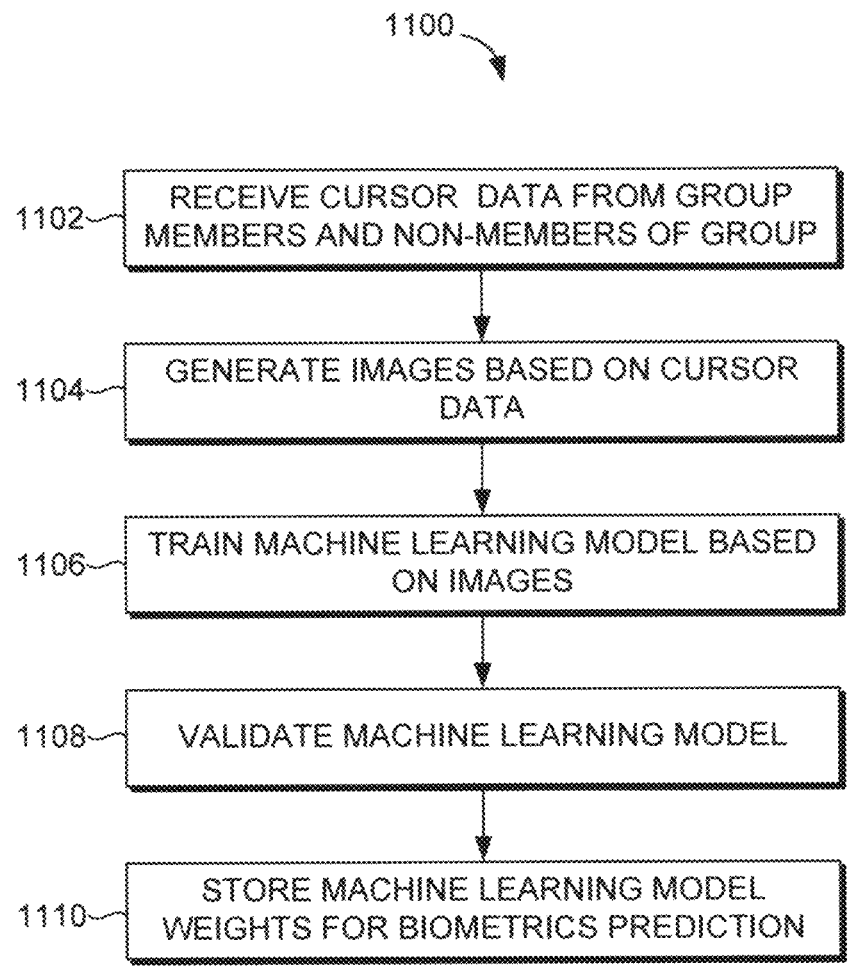
FIG. 11 illustrates a flow diagram of method steps for training a machine learning model to predict whether behavior biometric data belongs to a user included in a group of one or more users in accordance with the disclosed embodiments.

FIG. 11 illustrates a flow diagram of method steps for training a machine learning model to predict whether behavior biometric data belongs to a user included in a group of one or more users in accordance with the disclosed embodiments. Although the method steps are described in conjunction with the systems of FIGS. 1, 2, 7A, and 7B, persons skilled in the art will understand that any system configured to perform the method steps, in any order, falls within the scope of the present invention.

As shown in FIG. 11, a method 1100 begins at step 1102, where the fraud prediction application 741 receives cursor data 714 from members and/or non-members of the group of one or more users. In various embodiments, cursor data 714 may be received by the fraud prediction application 741 in a manner that is similar to the manner in which cursor data 714 is received at step 802, as described above in conjunction with FIG. 8. For example, cursor data 714 could be received via one or more events that include timestamped cursor movement data and/or click events.

Then, at step 1104, image generator 744 generates biometric images 746 based on the cursor data 714, for example, in a manner that is similar to the manner in which biometric images 746 are generated at step 804, as described above in conjunction with FIG. 8. In some embodiments, biometric images 746 that are generated based on cursor data 714 associated with members of the group are stored in a directory that is separate from a directory in which biometric images 746 generated based on cursor data 714 associated with non-members of the group are stored.

Next, at step 1106, the fraud prediction application 741 trains the machine learning model 742 based on biometric images 746 associated with members of the group and/or non-members of the group. For example, the machine learning model 742 could analyze biometric images 746 associated with members of the group (e.g., stored in a first directory) to detect one or more patterns associated with that group, and then analyze biometric images 746 associated with non-members of the group (e.g., stored in a second directory) to detect one or more different patterns that are associated with non-members of the group. In various embodiments, training of the machine learning model 742 results in a set of model weights, which can then be implemented to validate the machine learning model 742 and generate predictions via the machine learning model 742.

As noted above, the machine learning model 742 may include a NN model, such a convolutional NN model. As further noted above, in various embodiments, a limited number of biometric images 746 may be available for a particular group of one or more users. For example, in some implementations, fewer than 1,000 biometric images 746 may be available for a particular group, while, in other implementations fewer than 300 biometric images 746 may be available for a particular group. Consequently, in order to effectively train the NN model with this limited number of biometric images 746, certain NN parameters may be implemented by the fraud prediction application 741. An example of such NN parameters is described below in further detail in conjunction with FIG. 12.

At step 1108, the fraud prediction application 741 validates the machine learning model 742 based on the model weights generated at step 1106. For example, the machine learning model 742 may be validated by analyzing a set of one or more biometric images that are known to belong to member(s) or non-member(s) of the group. Accordingly, the accuracy of the machine learning model 742 and model weights can be determined. After validation is complete, the method 1100 proceeds to step 1110, where the fraud prediction application 741 stores the model weights and, optionally, the validation results associated with the model weights to system memory 740 or storage 722. The model weights may then be retrieved by the fraud prediction application 741 and implemented by the machine learning model 742 to analyze biometric images 746 in order to generate results, as described above in conjunction with step 806 of FIG. 8.

2.11.3 Neural Network Parameters for Small Datasets

Figure 12:
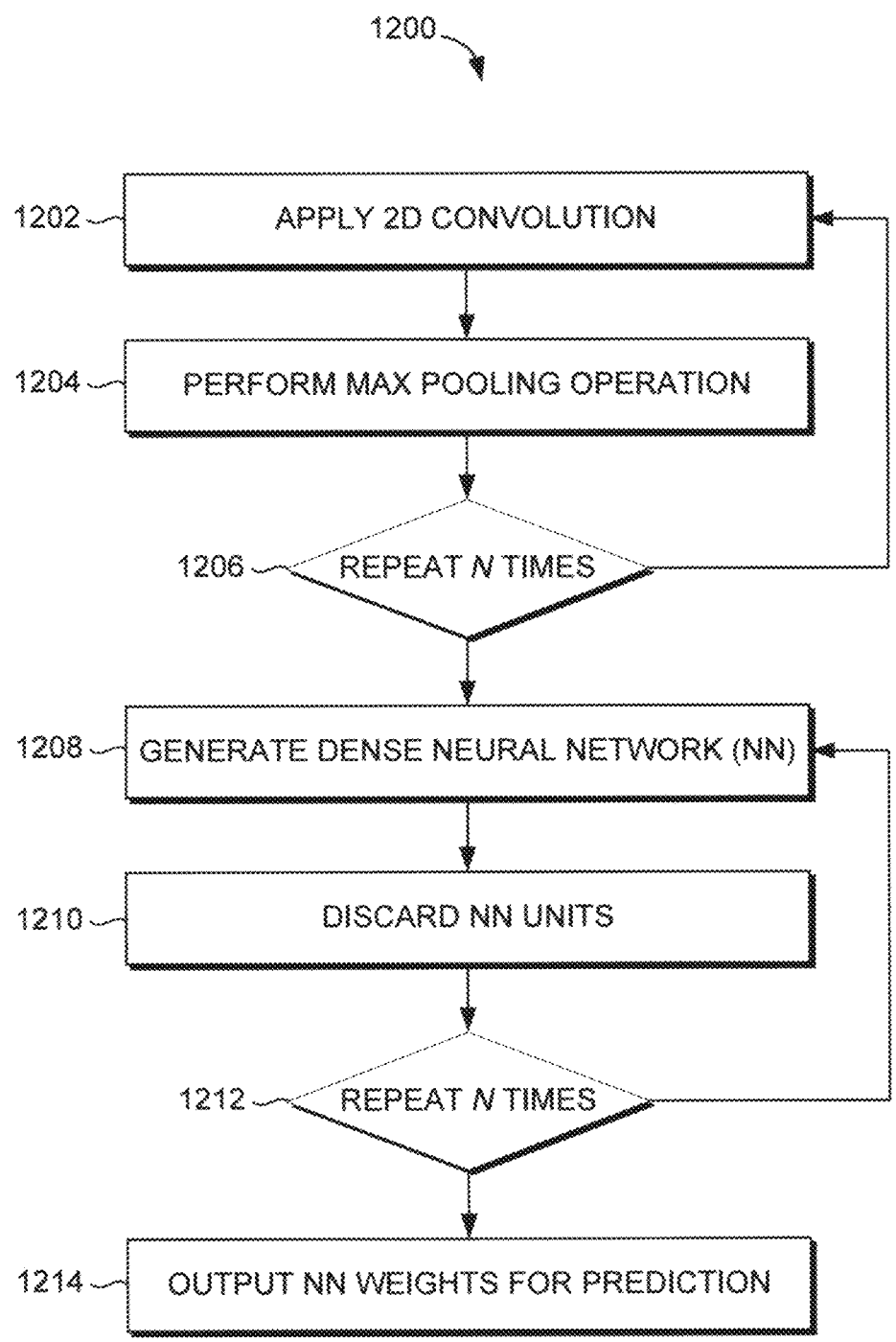
FIG. 12 illustrates a flow diagram of method steps for training a neural network (NN) based on a small dataset of behavior biometric data in accordance with the disclosed embodiments.

FIG. 12 illustrates a flow diagram of method steps for training a neural network (NN) based on a small dataset of behavior biometric data in accordance with the disclosed embodiments. Although the method steps are described in conjunction with the systems of FIGS. 1, 2, 7A, and 7B, persons skilled in the art will understand that any system configured to perform the method steps, in any order, falls within the scope of the present invention. As noted above, the techniques described herein could be implemented with a convolutional NN model, such as a VGG-16 model and/or a VGG-19 model. However, in various embodiments, any type of NN model may be implemented.

As shown in FIG. 12, a method 1200 begins at step 1202, where the fraud prediction application 741 applies a two-dimensional (2D) convolution layer to a representation of the biometric image 746 to generate a tensor of outputs. At step 1204, the fraud prediction application 741 applies a 2D pooling layer to the representation of the biometric image 746, for example, in order to reduce the spatial size and/or number of parameters of the representation of the biometric image 746. At step 1206, the fraud prediction application 741 may determine that steps 1202 and 1204 should be repeated a given number of times, such as three times. Accordingly, the method 1200 returns to steps 1202 and 1204, where a 2D convolution layer and a 2D pooling layer are again applied to the representation of the biometric image 746

Next, at step 1208, the fraud prediction application 741 generates and trains a dense NN having a particular number of neurons, such as approximately 32 neurons to 4096 neurons, or, in some embodiments, approximately 64 neurons to 512 neurons. Then, at step 1210, the fraud prediction application 741 discards a specified percentage of the units (e.g., neurons and/or activations).

In some embodiments, in order to more effectively recognize patterns in small datasets, a discard rate (also referred to as a dropout rate) of greater than 50% may be implemented in the machine learning model 742. For example, in some embodiments, a discard rate of 75% may be implemented in order to force the NN to retrain itself and generalize patterns included in a biometric image 746. Accordingly, higher prediction probabilities and greater prediction accuracy is achieved when comparing the small dataset to incoming biometric images 746. It is further noted that implementing a discard rate of greater than 50% (e.g., greater than 75%) stands in stark contrast to the discard rates that are typically implemented in conventional techniques, which generally discard units at a rate of less than 50%.

At step 1212, the fraud prediction application 741 may determine that steps 1208 and 1210 should be repeated a given number of times, such as three times. For example, in some embodiments, in a first iteration of steps 1208 and 1210, 64 neurons could be generated at step 1208, and a discard rate of 75% or greater could be implemented at step 1210. Then, in a second iteration of steps 1208 and 1210, 128 neurons could be generated at step 1208, and a discard rate of 75% or greater could be implemented at step 1210. Finally, in a third iteration of steps 1208 and 1210, 512 neurons could be generated at step 1208, and a discard rate of 75% or greater could be implemented at step 1210. These particular NN parameters have been demonstrated as being resilient to overfitting and providing high prediction accuracy when implemented in conjunction with small datasets of biometric images 746, such as datasets that include approximately 180 to 1,000 biometric images 746.

In sum, a fraud prediction application generates one or more images based on behavior biometric data and compares the images, via a machine learning model, to known images associated with a group of one or more authorized users. A prediction is then made regarding whether the behavior biometric data belongs to the group of one or more users.

Further, in various embodiments, the fraud prediction application may correlate a result of analyzing the behavior biometric data with one or more other types of data associated with a user and/or a computing device that is accessing a service or resource. A risk score may then be generated based on the result and the one or more other types of data.

Additionally, in some embodiments, a small dataset of biometric data associated with a known group of one or more users may be implemented to predict fraud. In such embodiments, various aspects of a NN may be modified in order to improve the detection accuracy, such as by implementing a dropout rate that is greater than 50% (e.g., a dropout rate greater than 75%) in order to force the NN to generalize patterns included in a small dataset.

At least one advantage of the disclosed techniques is that user fraud can be detected based on criteria, such as user cursor movements, that cannot be readily emulated by a fraudster. Accordingly, fraud can be more effectively detected, even when an attacker has taken physical or remote control of an authorized user's computer. Further, by correlating the results of behavior biometric analysis with other data sources, such as log data received from a client device and/or one or more server devices, the accuracy of fraud prediction can be improved. Finally, various techniques described herein are capable of effectively generalizing patterns included in small datasets of behavior biometric data, enabling more accurate comparisons to be made between the small datasets and behavior biometric data associated with an unknown user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving cursor movement data generated via a client device, wherein the cursor movement data comprises coordinates of a cursor and a speed of the cursor at each of the coordinates or a direction of movement of the cursor at each of the coordinates;
   generating an encoding for each coordinate of the coordinates, the encoding including one or more image parameters that represent a respective speed of the cursor or respective direction of movement of the cursor associated with the coordinate, wherein the one or more image parameters represent the respective speed of the cursor or the respective direction of movement of the cursor using a color value, a transparency value, a saturation value, or a luminance value;
   generating a transparency layer of an image for the cursor movement data, the transparency layer of the image including a visual depiction of cursor movement, wherein the one or more image parameters at each location within the visual depiction of cursor movement corresponds to a respective coordinate of the transparency layer, and wherein a brightness represented by the one or more image parameters increases as the respective speed of the cursor increases;
   generating a first flattened image by compositing the transparency layer with a white background layer that presents a speed of cursor movements via at least one of a brightness or a saturation of a color;
   generating a second flattened image from the first flattened image by compositing the first flattened image with a black background layer that differentiates the cursor movement data from second cursor movement data generated via the client device; and
   training a neural network that includes a first neural network model using a plurality of flattened images that includes the first flattened image.

2. The method of claim 1, wherein training the neural network comprises using a dropout rate that is greater than 50%.

3. The method of claim 1, wherein training the neural network comprises using a dropout rate that is greater than 75%.

4. The method of claim 1, wherein training the neural network comprises, after each iteration of a plurality of iterations, using a dropout rate that is at least 75%, and each layer included in a plurality of layers comprises a densely-connected neural network layer.

5. The method of claim 1, wherein training the neural network comprises, after each iteration of a plurality of iterations, using a dropout rate that is at least 75%, and each layer included in a plurality of layers includes 64 to 512 neurons.

6. The method of claim 1, wherein the plurality of images comprises less than 1000 images.

7. The method of claim 1, wherein the plurality of images comprises less than 300 images.

8. The method of claim 1, wherein the neural network comprises a convolutional neural network.

9. The method of claim 1, wherein the neural network is based on a Visual Geometry Group (VGG) neural network.

10. The method of claim 1, wherein the neural network is based on at least one of a Visual Geometry Group 16 (VGG-16) neural network or a VGG-19 neural network.

11. The method of claim 1, wherein generating each image included in the plurality of images comprises encoding the speed of the cursor at each of the coordinates in an image parameter included in the one or more image parameters.

12. The method of claim 1, wherein generating each image included in the plurality of images comprises encoding the direction of movement of the cursor in an image parameter included in the one or more image parameters.

13. The method of claim 1, wherein generating a transparency layer of an image for the cursor movement data comprises:
   generating a line with a first thickness at locations within the visual depiction of cursor movement that occurred during a click-and-drag event; and
   generating a line with a second thickness at each location within the visual depiction of cursor movement that did not occur during a click-and-drag event.

14. The method of claim 1, wherein generating a transparency layer of an image for the cursor movement data comprises:
   generating geometric objects of a first type at locations within the visual depiction of cursor movement that occurred during a left click event; and
   generating geometric objects of a second type at locations within the visual depiction of cursor movement that occurred during a right click event.

15. The method of claim 1, wherein the cursor movement data comprises a plurality of events, and each event included in the plurality of events comprises a sequence of time-stamped cursor coordinates.

16. The method of claim 1, wherein the cursor movement data is stored as events in one or more field-searchable data stores, and each event included in the events comprises time series cursor data.

17. The method of claim 1, wherein the cursor movement data is stored as events in one or more field-searchable data stores, and receiving the cursor movement data comprises extracting, at search time, the cursor movement data from one or more fields included in the events.

18. A fraud prediction system, comprising:
   a memory storing a fraud prediction application; and
   a processor coupled to the memory, wherein, when executed by the processor,
   the fraud prediction application configures the processor to:
      receive cursor movement data generated via a client device, wherein the cursor movement data comprises coordinates of a cursor and a speed of the cursor at each of the coordinates or a direction of movement of the cursor at each of the coordinates;

generating an encoding for each coordinate of the coordinates, the encoding including one or more image parameters that represent a respective speed of the cursor or respective direction of movement of the cursor associated with the coordinate, wherein the one or more image parameters represent the respective speed of the cursor or the respective direction of movement of the cursor using a color value, a transparency value, a saturation value, or a luminance value;

generate a transparency layer of an image for the cursor movement data, the transparency layer of the image including a visual depiction of cursor movement, wherein the one or more image parameters at each location within the visual depiction of cursor movement corresponds to a respective coordinate of the transparency layer, and wherein a brightness represented by the one or more image parameters increases as the respective speed of the cursor increases;

generating a first flattened image by compositing the transparency layer with a white background layer that presents a speed of cursor movements via at least one of a brightness or a saturation of a color;

generating a second flattened image from the first flattened image by compositing the first flattened image with a black background layer that differentiates the cursor movement data from second cursor movement data generated via the client device; and train a neural network that includes a first neural network model using a plurality of flattened images that includes the first flattened image.

19. The system of claim 18, wherein training the neural network comprises using a dropout rate that is greater than 50%.

20. The system of claim 18, wherein training the neural network comprises using a dropout rate that is greater than 75%.

21. The system of claim 18, wherein the plurality of images comprises less than 300 images.

22. The system of claim 18, wherein the neural network is based on a Visual Geometry Group (VGG) neural network.

23. The system of claim 18, wherein the neural network is based on at least one of a Visual Geometry Group 16 (VGG-16) neural network or a VGG-19 neural network.

24. One or more non-transitory computer-readable storage media including instructions that, when executed by one or more processors, cause the one or more processors to perform steps of:

receiving cursor movement data generated via a client device, wherein the cursor movement data comprises coordinates of a cursor and a speed of the cursor at each of the coordinates or a direction of movement of the cursor at each of the coordinates;

generating an encoding for each coordinate of the coordinates, the encoding including one or more image parameters that represent a respective speed of the cursor or respective direction of movement of the cursor associated with the coordinate, wherein the one or more image parameters represent the respective speed of the cursor or the respective direction of movement of the cursor using a color value, a transparency value, a saturation value, or a luminance value;

generating a transparency layer of an image for the cursor movement data, the transparency layer of the image including a visual depiction of cursor movement, wherein the one or more image parameters at each location within the visual depiction of cursor movement corresponds to a respective coordinate of the transparency layer, and wherein a brightness represented by the one or more image parameters increases as the respective speed of the cursor increases;

generating a first flattened image by compositing the transparency layer with a white background layer that presents a speed of cursor movements via at least one of a brightness or a saturation of a color;

generating a second flattened image from the first flattened image by compositing the first flattened image with a black background layer that differentiates the cursor movement data from second cursor movement data generated via the client device; and training a neural network that includes a first neural network model using a plurality of flattened images that includes the first flattened image.

25. The one or more non-transitory computer-readable storage media of claim 24, wherein the plurality of images comprises less than 300 images.

26. The one or more non-transitory computer-readable storage media of claim 24, wherein the neural network is based on a Visual Geometry Group (VGG) neural network.

27. The one or more non-transitory computer-readable storage media of claim 24, wherein the neural network is based on at least one of a Visual Geometry Group 16 (VGG-16) neural network or a VGG-19 neural network.

28. The one or more non-transitory computer-readable storage media of claim 24, wherein generating each image included in the plurality of images comprises encoding the speed of the cursor at each of the coordinates or the direction of movement of the cursor in the one or more image parameters.

* * * * *